United States Patent
Deisher

(10) Patent No.: US 7,392,183 B2
(45) Date of Patent: Jun. 24, 2008

(54) SCHEDULE EVENT CONTEXT FOR SPEECH RECOGNITION

(75) Inventor: Michael E. Deisher, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 928 days.

(21) Appl. No.: 10/330,403

(22) Filed: Dec. 27, 2002

(65) Prior Publication Data
US 2004/0128140 A1 Jul. 1, 2004

(51) Int. Cl.
G10L 15/00 (2006.01)
(52) U.S. Cl. .................................. 704/231
(58) Field of Classification Search ............... None
See application file for complete search history.

(56) References Cited

U.S. PATENT DOCUMENTS 5,764,852 A * 6/1998 Williams .................. 704/243
5,897,616 A * 4/1999 Kanevsky et al. ......... 704/246
6,345,254 B1 * 2/2002 Lewis et al. ............... 704/275

OTHER PUBLICATIONS

Deisher, et al., "Improving Speech Recognition of Mobile Devices", U.S. Appl. No. 10/176,326, filing date Jun. 20, 2002, 20 Pgs.

* cited by examiner

Primary Examiner—David D. Knepper
(74) Attorney, Agent, or Firm—Blakely, Sokoloff, Taylor & Zafman LLP

(57) ABSTRACT

A processor-based system obtaining information about an event from schedule data, and using the information to assist speech recognition of speech occurring during at least a portion of the event.

16 Claims, 3 Drawing Sheets

SCHEDULE EVENT CONTEXT FOR SPEECH RECOGNITION

BACKGROUND

This invention relates generally to mobile processor-based systems that include speech recognition capabilities. Mobile processor-based systems include devices such as handheld devices, pocket personal computers, personal digital assistants, digital cameras, laptop computers, data input devices, data collection devices, remote control units, voice recorders, and cellular telephones, to mention a few examples. Many of these devices may include speech recognition capabilities. With speech recognition, words uttered by a user may be converted to text, enabling automated transcription of speech. Spoken words may also be received as commands that enable selection and operation of the processor-based system's capabilities. In other instances, a system may provide automatic speaker identification capabilities where a speaker may be identified by comparison of his or her speech with a set of predefined models of known speakers. In a number of cases, the ability of a given device to recognize speech or identify a speaker is relatively limited. A variety of ambient conditions may adversely affect the quality of the speech recognition or speaker identification. Because the ambient conditions may change unpredictably, the elimination of ambient effects is much more difficult with mobile speech recognition platforms than with platforms where the ambient conditions are predetermined or static.

DESCRIPTION

Figure 1:
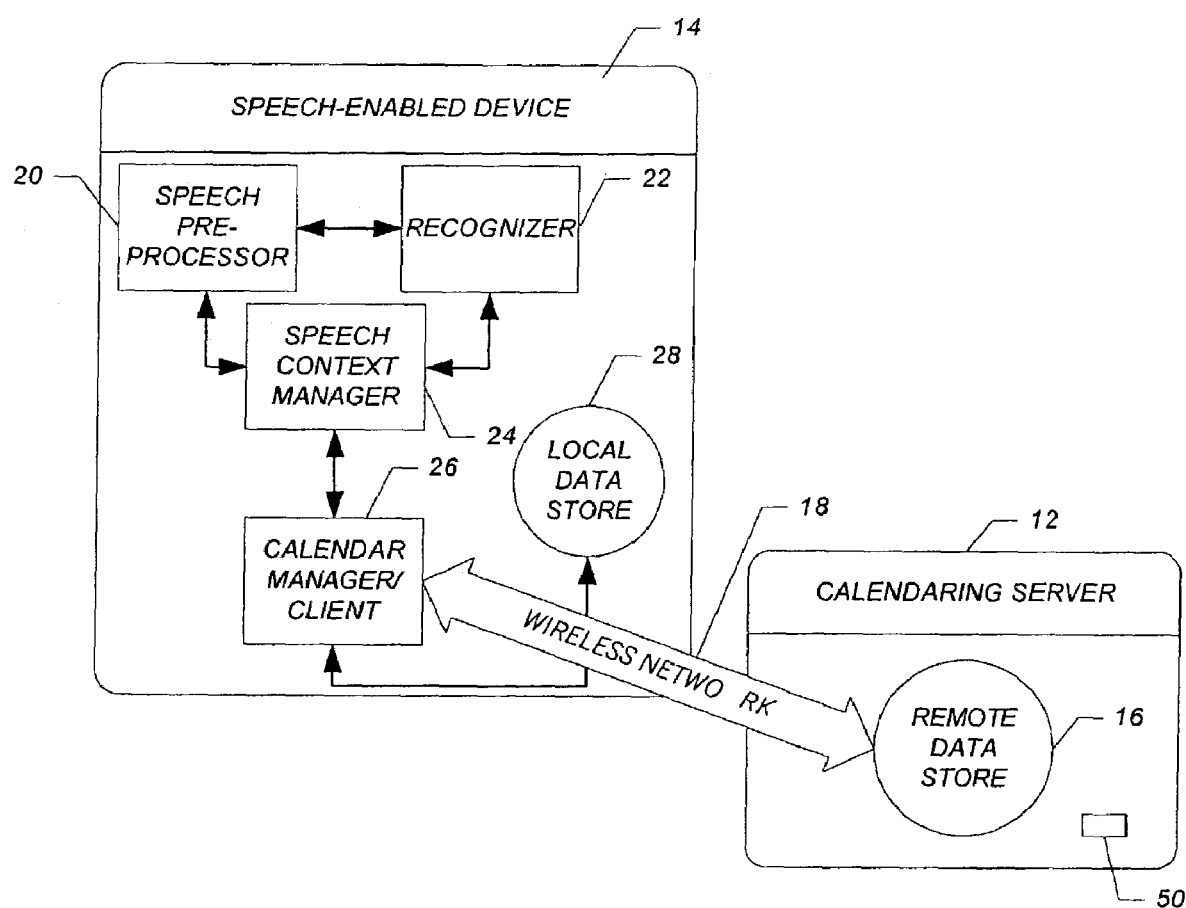
FIG. 1 depicts a speech recognition system in one embodiment of the claimed subject matter.

Embodiments of the claimed subject matter, generally, are systems which use information about events that is available from schedule data to assist in speech recognition and speaker identification tasks. One such system is depicted in FIG. 1. Referring to FIG. 1, a speech enabled mobile processor-based system 14 may be any one of a variety of mobile processor-based systems. Examples of such devices include laptop computers, pocket personal computers, personal digital assistants, cellular telephones, digital cameras, data input devices, data collection devices, appliances, and voice recorders, to mention a few examples.

The system 14 may have a personal scheduling, appointment book, calendar manager application or calendaring or scheduling component that includes the schedule of the user of the device. Such a calendar manager may use data solely internal to the device or may communicate with an external calendar or schedule database on a separate server that is part of a networking infrastructure in order to retrieve information about the user's calendar or schedule, or may combine the two approaches, by caching data previously obtained from the server in a local memory. The server 12 may be coupled to the mobile system 14 through a wireless network 18 in one embodiment of the claimed subject matter; the system may alternatively connect to the networked server using an occasionally connected wired network connection or a remote access method such as dial-up networking; or access the server using an occasional connection to an intermediate host computer which is in turn connected to a server, via a peripheral interconnect.

The ability of system 14 to recognize spoken words may be improved in a variety of environments or ambient conditions if a recognizer 22 has data that is specific to the acoustic environment of the speaker. Such data may be deduced from information available to the calendar manager 26. The calendar manager may be able to look up the room or another location scheduled for use during an event based on the identity of the user of the system, calendar data and the current time, and using the room or location information, obtain information about the acoustic characteristics of the surrounding space either from data local to the device 14 or from data on a server data store 16. Those characteristics may include the size of the room, noise sources, such as ventilation ducts or exterior windows, the specific type of each noise source, if any, and reverberation characteristics of the space. Such data may be compiled from pre-existing measurements and information relating to the specifics of a particular building, room, or office based on construction and architectural plans, or from other prior data gathering. Alternatively, in some embodiments of the claimed subject matter, the system 14 may be able to create such data and cause it to be stored on encountering a new location, or be able to update data relating to a location for which data is already available if the system can refine or improve upon the data, or if the acoustic characteristics of the space have changed.

Other information that may be leveraged to improve speech recognition of any given speaker includes the number, identities and physical locations of other nearby speakers at the time the speech recognition task is being performed. These speakers may be potential sources of interference and can be identified based on their being listed in the calendar database as participating in the same event as the user of the system 14. Data about the other speakers' location may be explicitly available as well, if for example, seating at the event is predetermined, or in another example, if the interfering speakers are seated in an auditorium and the speaker whose speech is being recognized is on a stage. In addition, the identity of nearby people may be obtained by the speech recognition system using ad hoc discovery. The system may do this by recording and analyzing the speech of persons present at the event and then by comparing the sampled speech with stored personal speech models that may be available from the server. Alternatively, the system 14 may interact with the user and allow the user to assist it with recognizing the identities of the other speakers at the event by entering their names, in one embodiment of the claimed subject matter.

The system 14 includes a speech context manager 24 that is coupled to the calendar manager/client 26, a speech recognizer 22, and a noise mitigating speech preprocessor 20.

When speech recognition is attempted by the system 14, the speech context manager 24 retrieves a current context from the server 12 in accordance with one embodiment of the claimed subject matter. Based on the size of the surrounding space, the context manager 24 adjusts the acoustic models of the recognizer 22 to account for reverberation.

This adjustment may be done in a variety of ways including using model adaptation, such as maximum likelihood linear regression to a known target. The target transformation may have been estimated in a previous encounter at that position or may be inferred from the reverberation time associated with the space. The context manager may also perform the adjustment by selecting from a set of previously trained acoustic models that match various acoustic spaces typically encountered by the user.

As another alternative, the context manager 24 may select from among feature extraction and noise reduction algorithms that are resistant to reverberation based on the size of the acoustic space. The acoustic models may also be modified to match the selected front-end noise reduction and feature extraction. Models may also be adapted based on the identity of nearby people, retrieving and loading speaker dependent acoustic models for each person, if available. Those models may be used for automatic transcription of hallway discussion in one embodiment of the claimed subject matter.

Another way that the adjustment may be done is by initializing and adapting a new acoustic model if the acoustic space has not been encountered previously. Once the location is adequately modeled, the system 14 may send the information to the server 12 to be stored in the remote data store 16 for future visitors to the same location. Furthermore, if speaker specific acoustic models such as identification or recognition models are not available for a specific speaker at the event, or if for some reason such as an illness a speaker's speech has changed significantly and permanently, the system may update the remote data store with new or changed information regarding the new or changed speakers.

Information regarding the number of participants at the event may be used by the system 14 in initializing Blind Signal Separation (BSS). BSS is an algorithm that can improve recognition accuracy in multi-talker babble noise, and is used to pre-process input to a speech recognizer. BSS works best when correctly initialized with the number of sources of babble, or speech that is to be ignored by the system. Further, it may be possible for the system to deduce the likely pitch range of speakers from the gender of the speaker if such information is available. This may then additionally improve the performance of the BSS pre-processor by assisting it in filtering certain speakers in or out at the preprocessing stage.

Another example of adaptation, based on the identity of nearby speakers derived from schedule information, the system 14 may assist the user in identifying them in meetings or events where the user may not initially know the identities of all participants. The user may then use the names of the identified speakers to interact with the system 14 and in one embodiment, indicate to the system 14 using an input device, whether their speech should be transcribed. In some embodiments, speaker identification may be further used to automatically determine whether speech for an identified speaker should be transcribed, based, for example, on the user having previously identified speakers that he or she wishes to designate as a transcription source (i.e., a person whose speech should be transcribed). This list may be stored either in the system 14 or be available from a remote source such as the server 12. In other embodiments of the claimed subject matter, the system 14 may use the names of identified speakers in combination with organizational information that also may be available from the data store 16 at server 12 and then use that information to apply pre-defined criteria such as whether a person is in a particular department of an organization, to determine whether a specific speaker at an event should be designated as a transcription source.

As still another example, based on the orientation of the system 14, the location of proximate people, and their designation as transcription sources, a microphone array controlled by preprocessor 20 may be configured to place nulls in the direction of the closest persons who are not transcription sources. Since that direction may not be highly accurate and is subject to abrupt change, this method may not supplant interferer tracking via a microphone array. However, it may provide a mechanism to place the nulls when the interferer is not speaking, thereby significantly improving performance when an interferer starts to speak.

Figure 2:
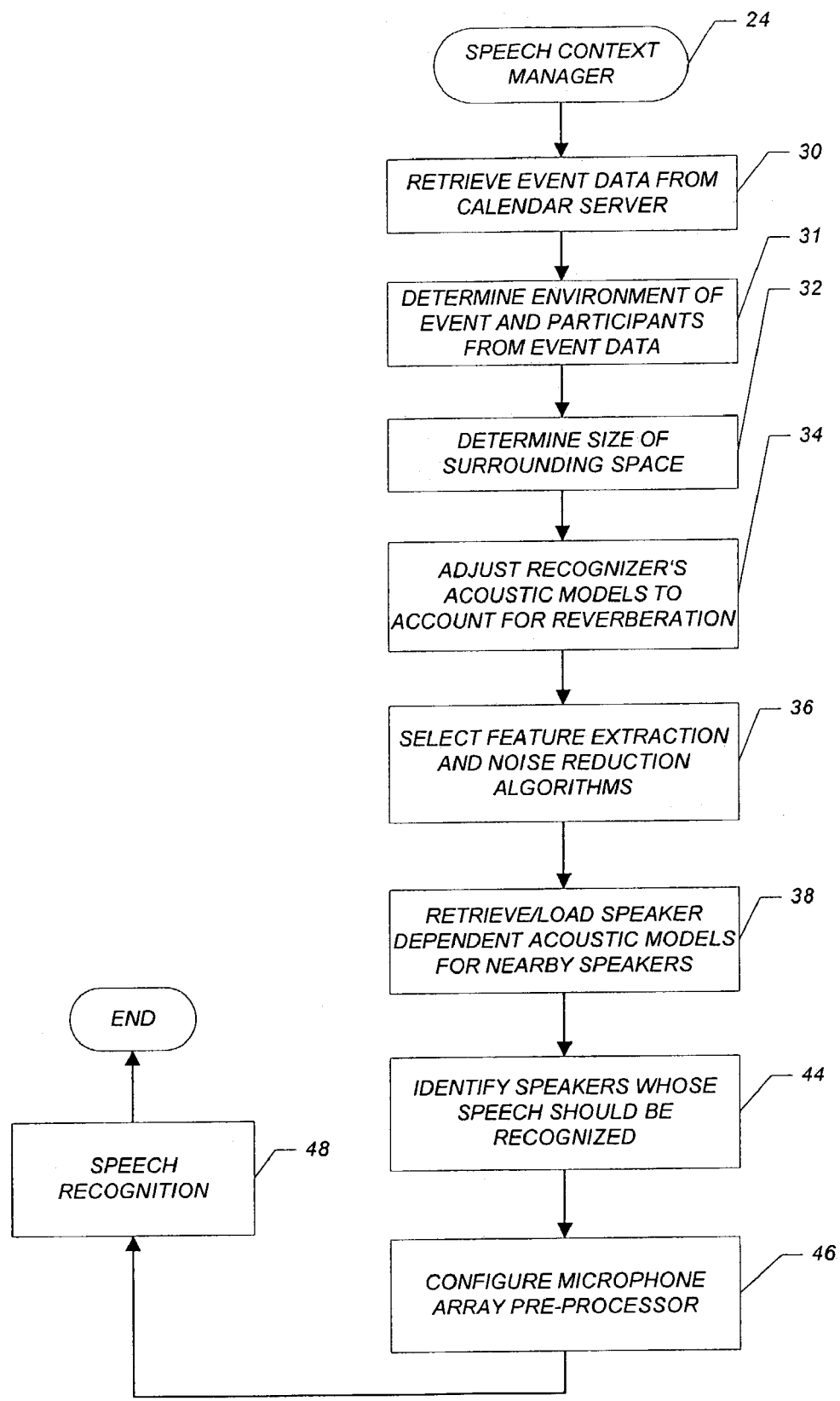
FIG. 2 depicts processing performed by a speech context manager in one embodiment.

Referring to FIG. 2, in accordance with one embodiment of the claimed subject matter, the speech context manager 24 may be a processor-based device including both a processor and storage for storing instructions to be executed on the processor. Thus, the speech context manager 24 may be software or hardware. Initially, the speech context manager 24 retrieves a current context from the server 12, as indicated in block 30. Then the context manager 24 may determine the size of the surrounding space proximate to the device 14, as indicated in block 32. The device 14 may adjust the recognizer's acoustic models to account for local reverberation, as indicated in block 34.

Then feature extraction and noise reduction algorithms may be selected based on the understanding of the local environment, as indicated in block 36. In addition, the speaker-dependent acoustic models for nearby speakers may be retrieved and loaded, as indicated in block 38. These models may be retrieved, in one embodiment, from the server 12.

As indicated in block 44, any speakers whose speech should be recognized may be identified. The microphone array preprocessor 20 may be configured, as indicated in block 46. Then speech recognition may be implemented, as indicated in block 48, having obtained the benefit of the location information.

Figure 3:
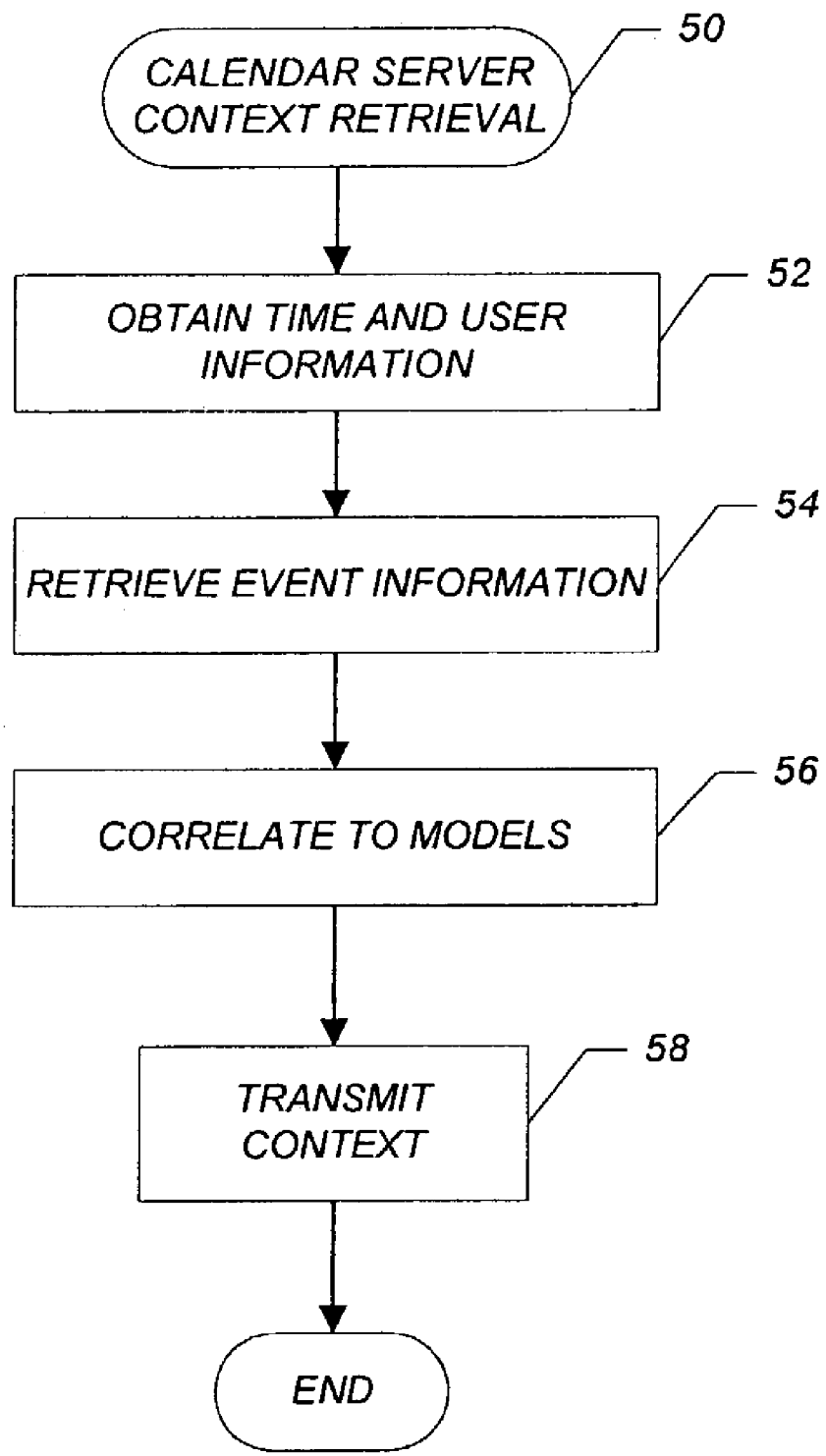
FIG. 3 depicts a calendar based speech context retrieval process in one embodiment.

Referring to FIG. 3, the calendaring server 12 may be implemented through software 50 that retrieves event context in accordance with one embodiment of the claimed subject matter. The software 50 may be stored in an appropriate storage on the server 12. Initially, the server 12 receives a request for context information from a system 14, including user and time information, as indicated in block 52. Once received, the server 12 obtains the schedule information from the system 14, as indicated in block 54. The location information may then be correlated to available models in the data storage 16, as indicated in block 56. Once an appropriate model is identified, the context may be transmitted to the device 14 over the wireless network, as indicated in block 58.

The present invention includes various steps. The steps of the present invention may be performed by hardware devices, or may be embodied in machine-executable instructions, which may be used to cause a general-purpose or special-purpose processor or logic circuits programmed with the instructions to perform the steps. Alternatively, the steps may be performed by a combination of hardware and software. The present invention may be provided as a computer program product that may include a machine-readable medium having stored thereon data which when accessed by a machine, may cause the machine to perform a process according to the present invention. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
adjusting an acoustic model of a speech recognizer using a speech context for an event to assist with speech recognition; and
using the speech context, performing one or more of automatically transcribing speech, interpreting the speech as a command for a command-driven system, and identifying a speaker.

2. The method of claim 1 wherein the adjusting of the acoustic model of the speech recognizer using the speech context for the event comprises adjusting the acoustic model of the speech recognizer based on parameters describing an environment in which the event is scheduled to occur.

3. The method of claim 2 wherein the adjusting of the acoustic model of the speech recognizer using the speech context for the event further comprises adjusting the acoustic model of the speech recognizer to account for reverberation based on the reverberation time of the space in which the event is scheduled to occur.

4. The method of claim 2 wherein the adjusting of the acoustic model of the speech recognizer using the speech context for the event further comprises adjusting the acoustic model of the speech recognizer based on information about noise sources in the environment in which the event is scheduled to occur.

5. The method of claim 1 wherein using the speech context to assist speech recognition comprises receiving the speech coinext from a remote server over a wireless network.

6. The method of claim 1 wherein using the speech context to assist with the speech recognition comprises: selecting a person as a transcription source based on one or more of the person's name the person's position in an organization, and the person's membership on a list of transcription sources.

7. The method of claim 1 wherein using the speech context to attend the event to assist with the speech recognition comprises:
identifying a person present at the event based on comparing a speech of the person to a stored acoustic speech identification model of a person scheduled to attend the event; and
using an acoustic speech recognition model of the identified person to assist with the speech recognition.

8. The method of claim 1 wherein using speech context to attend the event to assist with the speech recognition comprises:
initializing a pre-processor to filter sound input based on one or more a number of speakers scheduled to attend the event, and
an estimated pitch range of a speaker scheduled to attend the event based on a gender of the speaker.

9. A system comprising:
a processor; and
a data store coupled to the processor, the data store having stored therein data which when accessed by the processor cause it to obtain information about an event from schedule data, and the data store having stored therein further data which when accessed by the processor, causes the processor to use the information to assist with speech recognition;
a clock coupled to the processor, the clock to allow determination of time;
a schedule data base accessible from the processor, the schedule data from which information about the event is capable of being selected by the processor, depending on the time; and
a speech recognizer module coupled to the processor, the speech recognizer module including a acoustic model adjustable by the processor, using a speech context for the event included in the information about the event.

10. The system of claim 9 further comprising a pre-processing module to filter sound input to the speech recognizer module based on one or more of a number of speakers scheduled to attend the event, and an estimated pitch range of a speaker scheduled to attend the event based on a gender of the speaker.

11. A computer readable medium having a stored computer program which causes computer to perform a method comprising:
adjusting an acoustic model of a speech recognizer using a speech context for an event to assist with speech recognition; and
usinging the speech context, perform one or more of automatically transcribing speech, interpreting the speech as a command for a command-driven system, and identifying a speaker.

12. The computer readable medium of claim 11 wherein adjusting the acoustic model of the speech recognizer using the speech context for the event comprises adjusting the acoustic model of the speech recognizer based on parameters describing an environment in which the event is scheduled to occur.

13. The computer readable medium of claim 12 wherein adjusting the acoustic model of the speech recognizer using the speech context for the event further comprises adjusting the acoustic model of speech recognizer to account for reverberation based on the reverberation time of the space in which the event is scheduled to occur.

14. The computer readable medium of claim 12 wherein adjusting the acoustic model of the speech recognizer using the speech context for the event farther comprises adjusting the acoustic model of the speech recognizer based on information about noise sources in the environment in which the event is scheduled to occur.

15. The computer readable medium of claim 11 wherein using the speech context to assist with the speech recognition comprises:
selecting a person as a transcription source based on one or more of a person's name, the person's position in an organization, and the person's membership on a list of transcription sources.

16. The computer readable medium of claim 11 wherein using speech context to attend the event to assist with the speech recognition comprises:
initializing a pre-processor to filter sound input based on one or more of a number of speakers scheduled to attend the event; and
an estimated pitch range of a speaker scheduled to attend the event based on a gender of the speaker.

* * * * *

UNITED STATES PATENT AND TRADEMARK OFFICE
CERTIFICATE OF CORRECTION

| | |
|---|---|
| PATENT NO. | : 7,392,183 B2 |
| APPLICATION NO. | : 10/330403 |
| DATED | : June 24, 2008 |
| INVENTOR(S) | : Deisher |

It is certified that error appears in the above-identified patent and that said Letters Patent is hereby corrected as shown below:

In column 5, at line 39, delete "cointext" and insert --context--.
In column 6, at line 46, delete "farther" and insert --further--.

Signed and Sealed this

Twentieth Day of January, 2009

JON W. DUDAS
*Director of the United States Patent and Trademark Office*